US007465068B2

(12) United States Patent
Fornell

(10) Patent No.: US 7,465,068 B2
(45) Date of Patent: Dec. 16, 2008

(54) ILLUMINATION SYSTEM AND METHOD FOR A MOBILE COMPUTING DEVICE

(75) Inventor: Peter Fornell, Oswego, OR (US)

(73) Assignee: IXI Mobile (R&D), Ltd. (IL)

( * ) Notice: Subject to any disclaimer, the term of this patent is extended or adjusted under 35 U.S.C. 154(b) by 58 days.

(21) Appl. No.: 10/817,260

(22) Filed: Apr. 2, 2004

(65) Prior Publication Data

US 2005/0225983 A1 Oct. 13, 2005

(51) Int. Cl.
*F21V 23/04* (2006.01)
*H04Q 7/20* (2006.01)
(52) U.S. Cl. .......................... 362/276; 362/88; 362/552
(58) Field of Classification Search .................. 362/85, 362/88, 276, 552, 559, 642, 800, 802; 250/205, 250/214 AL; 455/566
See application file for complete search history.

(56) References Cited

U.S. PATENT DOCUMENTS 6,299,322 B1 * 10/2001 Yokota ........................ 362/85
6,850,166 B2 * 2/2005 Deeds ......................... 340/635
7,117,019 B2 * 10/2006 Abbasi ........................ 455/566
2004/0012556 A1 * 1/2004 Yong et al. ................... 345/102
2004/0127198 A1 * 7/2004 Roskind et al. ........... 455/412.2
2005/0110740 A1 * 5/2005 Linzmeier et al. ........... 345/102

* cited by examiner

*Primary Examiner*—Bao Q Truong
(74) *Attorney, Agent, or Firm*—Century IP Group, Inc.; F. Jason Far-hadian, Esq.

(57) ABSTRACT

A method of configuring one or more illumination states for illuminating at least two user interface devices of a mobile device, the method comprising assigning a first illumination state to first and second user interface devices, when intensity of ambient light is greater than a first threshold; assigning the first illumination state to the first interface device, and a second illumination state to the second interface device, when the intensity of the ambient light is between the first threshold and a second threshold; and assigning the second illumination state to the first and the second user interface devices, when the intensity of the ambient light is less than the second threshold.

19 Claims, 6 Drawing Sheets

ILLUMINATION SYSTEM AND METHOD FOR A MOBILE COMPUTING DEVICE

BACKGROUND

FIELD OF INVENTION

The present invention relates generally to an illumination mechanism for a mobile device and, more particularly, to controlling the backlight settings for a mobile communication device so that battery power is utilized in an efficient manner.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

RELATED ART

Handheld communication and computing devices such as cellular phones and personal digital assistants (PDAS) are generally equipped with a lighting mechanism that is used to illuminate the device's keypad or screen. This lighting mechanism is typically referred to as a "backlight" because it consists of a light emitting diode (LED) positioned in the back of the keypad or the screen.

The parts of the keypad and the screen are made from translucent or transparent material, so that when the backlight is turned on the emitting light illuminates the screen and the keypad. This added illumination is very helpful to a user, especially at night or in the dark, when external lighting is insufficient for the user to operate the device.

The currently used backlight systems either constantly remain on while the phone is turned on, or are turned on as soon as the user interacts with the device, for example, when a button on the keypad is pressed. These types of systems typically have a shorter battery operation life, between each charge, because the backlight produces a constant drain on the battery, even under circumstances when no backlight is needed (e.g., during the day).

Some current backlight systems are complemented with a shutoff timer that can be set by the user to turn off the backlight, if the user does not interact with the device for a certain period. While this shutoff timer is useful in preserving battery power, it is still not a smart solution. That is, even backlights equipped with the shutoff timer remain on in occasions when no backlight is needed.

As such, the current backlight systems are not smart enough to determine the level of lighting to which the device is exposed. Thus, for example, even when there is sufficient natural or artificial light for a user to operate the device, the backlight is still illuminated when the user touches the keypad.

A system and method is needed to overcome the above shortcomings by limiting the backlight illumination only to circumstances when the ambient light is insufficient for the user to see or operate the mobile device.

SUMMARY

The present disclosure is directed to a system and corresponding methods for controlling an illumination mechanism configured to produce artificial lighting needed for operating a mobile device.

For the purpose of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one or more embodiments, a method for controlling an illumination system for a mobile device is provided. The method comprises measuring a first intensity of ambient light for the mobile device using a light sensing mechanism; comparing the first intensity with a threshold value; adjusting illumination intensity of an illuminating mechanism that illuminates a user interface component of the mobile device, when the first intensity is not approximately equal to a first threshold value.

The adjusting comprises increasing the illumination intensity of the illuminating mechanism or decreasing the illumination intensity of the illuminating mechanism depending on the intensity of ambient light. The adjusting takes place when the first intensity is less than the threshold value, for example, or when the first intensity is greater than the threshold value.

In one embodiment, the illuminating mechanism is a backlight for lighting the user interface, such as a light emitting diode (LED). The user interface may comprise one or more keys on a keypad of the mobile device or a display screen of the mobile device.

In another embodiment, the illumination method further comprises adjusting illumination intensity of a second illuminating mechanism that illuminates a second user interface component of the mobile device, when the first intensity is not equal to a second threshold value.

In accordance with yet another embodiment, an illumination system for illuminating one or more user interface components of a mobile device is provided. The illumination system comprises a light sensor for measuring intensity of ambient light; a first illumination mechanism for illuminating a first user interface component; a power management module for adjusting illumination intensity of the first illumination mechanism based on the intensity of the ambient light.

The power management module causes the illumination intensity of the first illumination mechanism to be increased, when the intensity of the ambient light is less than a first threshold. Alternatively, the power management module causes the illumination intensity of the first illumination mechanism to be decreased, when the intensity of the ambient light is more than a first threshold.

In one embodiment, the light sensor comprises a phototransistor and the first illumination mechanism comprises a light emitting diode (LED), for example. The power management module comprises a comparator for comparing a first signal generated by the light sensor with a second signal generated by a voltage source, wherein the first signal represents the intensity of the ambient light and the second signal represents a first threshold value.

The power management module further comprises a converter for adjusting illumination intensity of the first illumination mechanism based on a third signal generated by the comparator, the third signal representing a relationship between the values represented by the first signal and the second signal. In an alternative embodiment, the power management module comprises a power management chip in communication with a microcontroller for determining a degree with which the illumination intensity of the first illumination mechanism is adjusted.

In accordance with one embodiment, a method of configuring one or more illumination states for illuminating at least two user interface devices of a mobile device is provided. The method comprises assigning a first illumination state to first and second user interface devices, when intensity of ambient light is greater than a first threshold; assigning the first illumination state to the first interface device, and a second illumination state to the second interface device, when the intensity of the ambient light is between the first threshold and a second threshold; and assigning the second illumination state to the first and second user interface devices, when the intensity of the ambient light is less than the second threshold. The first illumination state represents an on state and the second illumination state represents an off state.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A control system and corresponding methods, according to an embodiment of the present invention, facilitate the operation and provide an illumination system for a mobile device so that user interface components of the device are viewable in all lighting conditions. Said illumination system may be applicable, in various embodiments, to a backlight, background or foreground lighting system embedded in or otherwise attached to the mobile device.

Numerous specific details are set forth to provide a thorough description of various embodiments of the invention. Certain embodiments of the invention may be practiced without these specific details or with some variations in detail.

Figure 1:
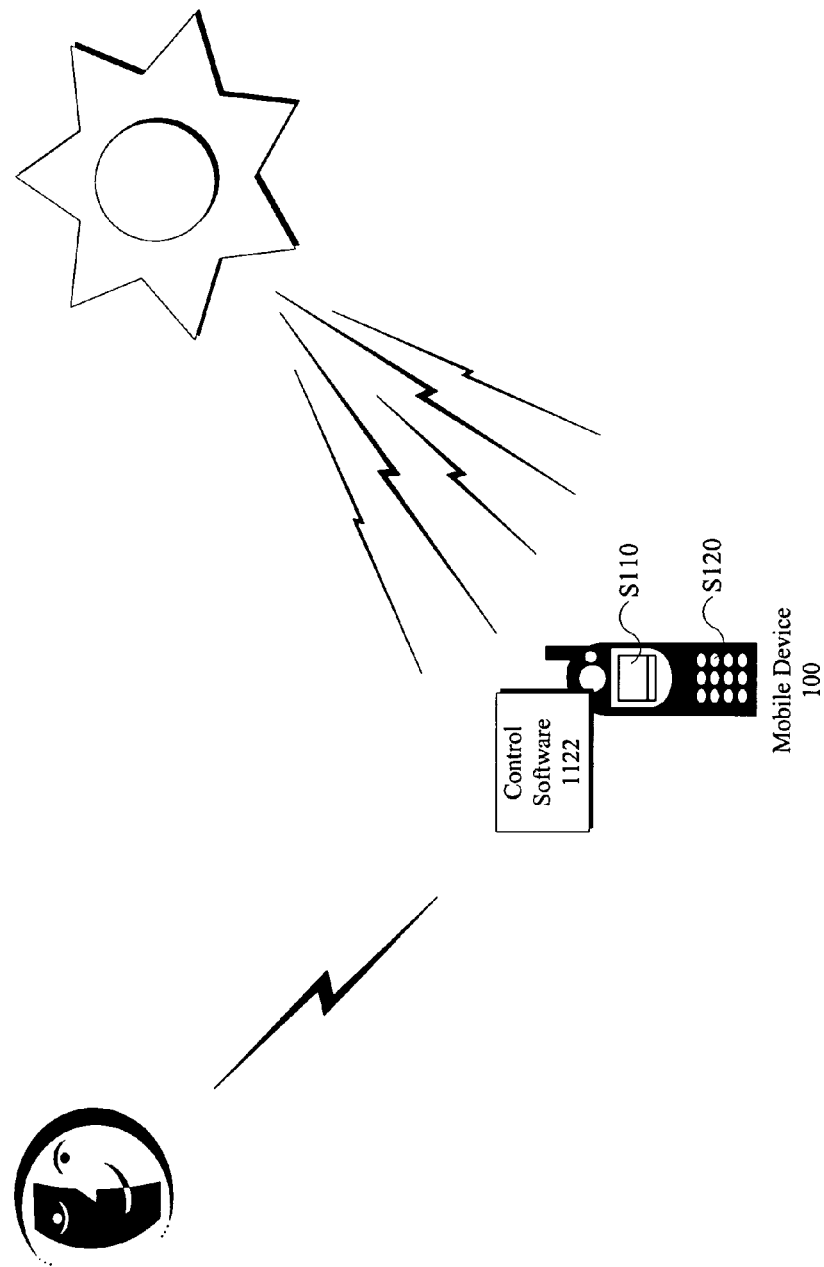
FIG. 1 illustrates an exemplary environment in which an illumination mechanism may be utilized, in accordance with one embodiment of the invention.

Referring to FIG. 1, in one or more embodiments of the present invention, a mobile device 100 is illustrated in an environment that is susceptible to changes in lighting conditions. For example, as shown, during the day, mobile device 100 may be exposed to sunlight so that there is no need for an illumination system to allow a user to operate the device. At night or in a dark place, however, mobile device 100 may require an illumination system to light user interface components of mobile device 100 so that a user can properly operate the device.

In one embodiment, mobile device 100 may comprise one or more means of wireless communications. Wireless communication technologies suited for connecting wireless devices in short-range area networks (i.e., IEEE 802.11 or Bluetooth), and long-range area networks (i.e., GSM) and the like may be utilized to connect mobile device 100 to other mobile devices or wireless infrastructure components, for example. Mobile device 100, in one or more embodiments, can be a cellular telephone, a personal digital assistance (PDA), a laptop computer, a desktop computer, or other computing or processing machine capable of data storage and data communication, for example.

Mobile device 100 comprises one or more user interface components. Such components allow the user to view or input data, and may for example comprise a display screen 110 and a keypad 120. Mobile device 100 further comprises an illumination system 200 (see FIGS. 2A, 2B) for illuminating said user interface components so that a user may be able to easily view and interact with such components, when it is dark or not so light. Control software 1122, for controlling the illumination system 200, may be stored in and/or executed on mobile device 100 to control the operation and functional features of illumination system 200.

One of ordinary skill in the art will appreciate that mobile device 100, in accordance with one embodiment, may be connected to one or more types of networks (e.g., personal area networks, local area networks, cellular communications networks, personal mobile gateways, etc.) without limiting the scope of the invention. The terms "connected," "coupled," or any variant thereof, mean any connection or coupling, either direct or indirect, between two or more elements. The coupling or connection between the elements can be physical, logical, or a combination thereof.

As used herein, the terms mobile device, cellular phone and communications network are to be viewed as designations of one or more computing environments that comprise application, client or server software for servicing requests submitted by respective software included in devices or other computing systems connected thereto. These terms are not to be otherwise limiting in any manner. Control software 1122, for example, may be comprised of one or more modules that execute on one or more computing systems, as provided in further detail below.

Figure 2A:
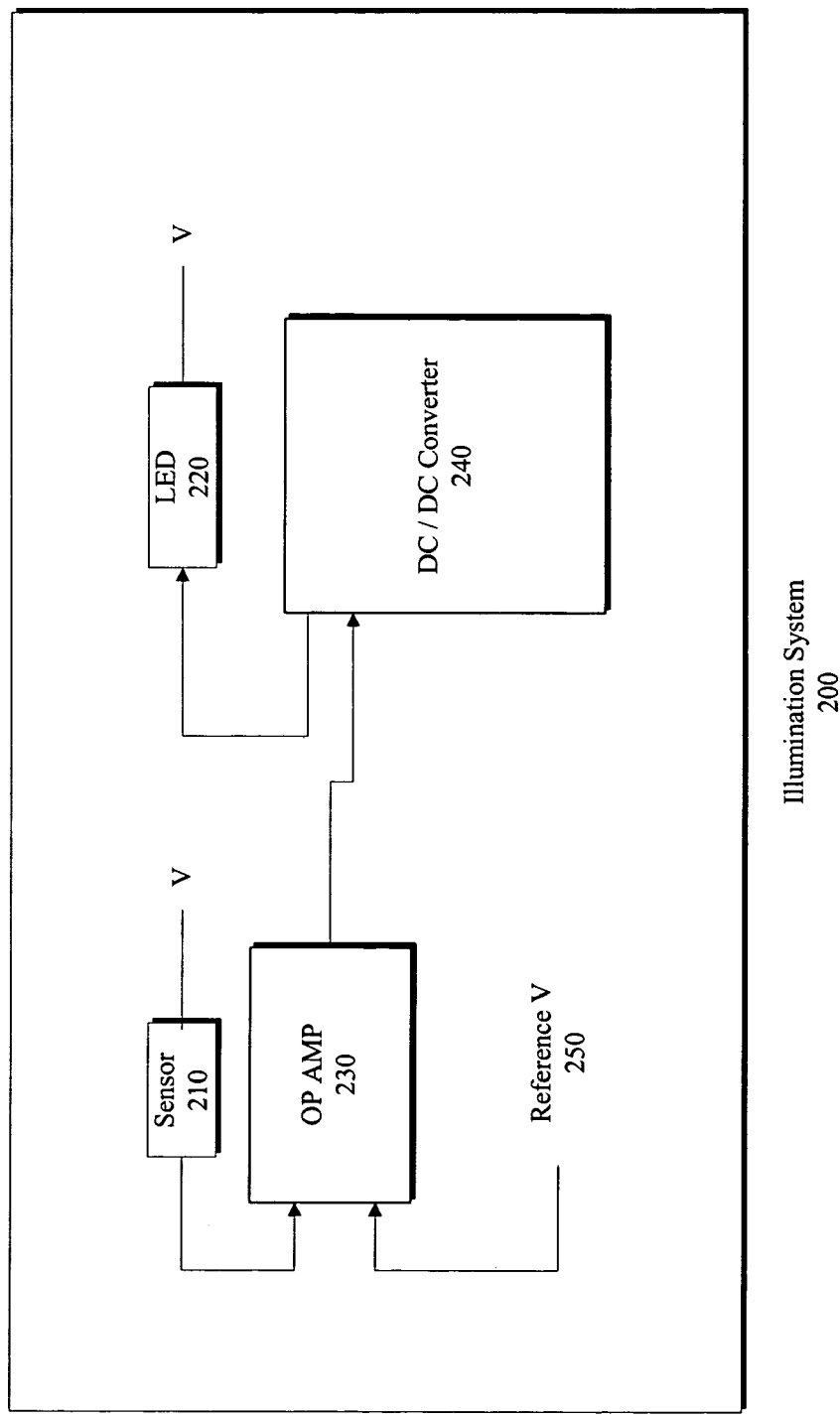
FIGS. 2A and 2B are block diagrams of exemplary power management systems configured to control an illumination mechanism, in accordance with one or more embodiments.
Figure 2B:
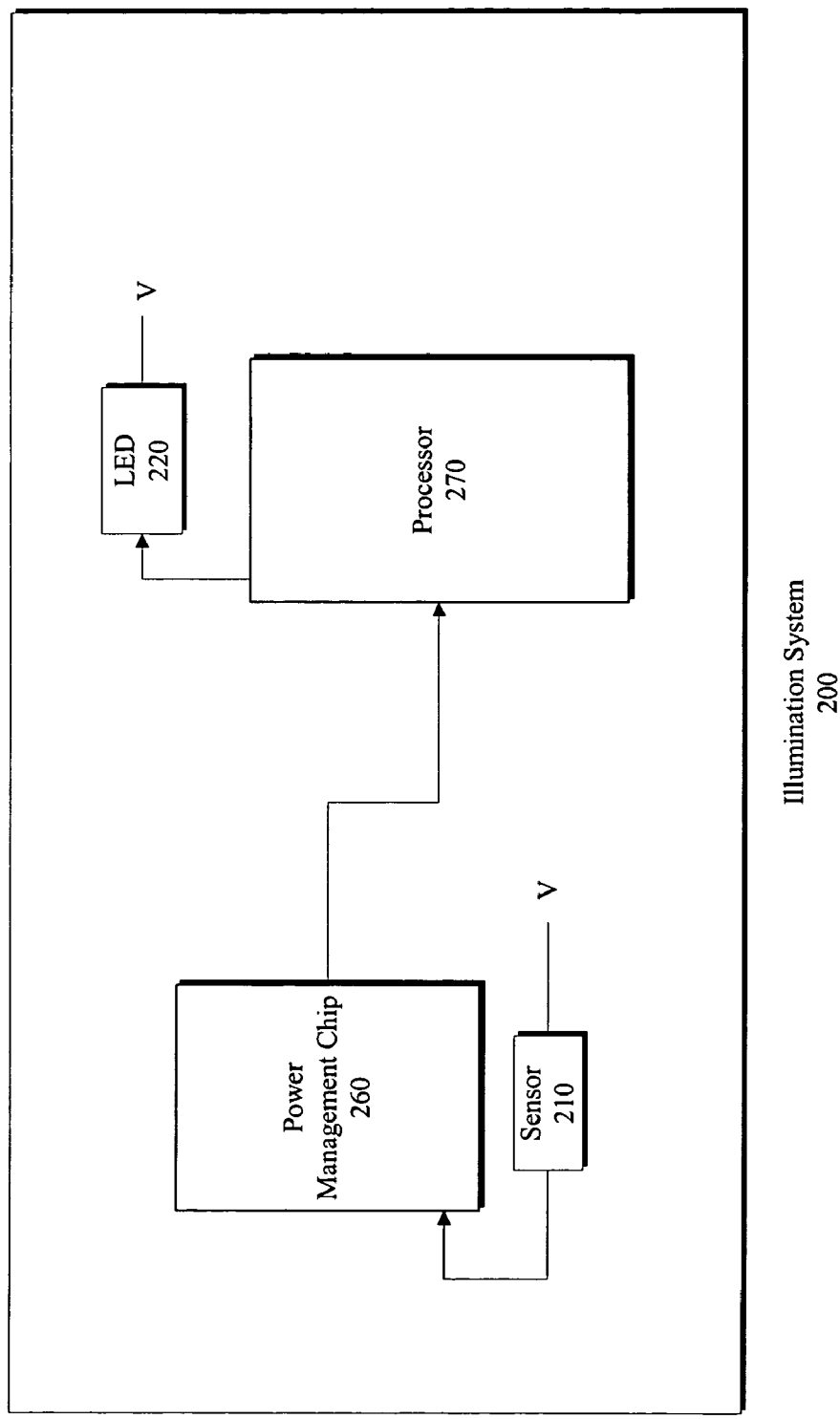

Referring to FIGS. 2A and 2B, in one or more embodiments, illumination system 200 comprises one or more electrical modules or components, such as sensor 210 and illuminating mechanism 220. The reference to sensor 210 and illuminating mechanism 220 is made in the singular form, through out this disclosure. It is noteworthy, however, that in alternative embodiments any number of sensors 210 or illuminating mechanisms 220, either alone or in combination, may be utilized depending on system implementation.

Sensor 210 can be, for example, a transistor that is sensitive to light (i.e., a phototransistor). In one embodiment, for example, sensor 210 is a SDP8405 Silicon Phototransistor manufactured by Honeywell Corporation. Any other light sensitive element that can be used to measure or detect variations and attenuations in mobile device 100's ambient light may be used instead or in addition to the above-named phototransistor.

Illuminating mechanism 220 may be a light emitting diode (LED), an electro luminescent (EL), or other light producing means that can be turned on or off, or controlled to emanate light with variable intensities. It is noteworthy that illuminating mechanism 220 may comprise other software or hardware modules, such as power amplifier, transistors, field effect transistors (FETs), etc. that can be used instead, in conjunction or in combination with the light emitting mechanisms to accomplish the same results.

Referring to FIG. 2A, in a first exemplary embodiment, illumination system 200, in addition to sensor 210 and illuminating mechanism 220 (hereafter referred to by way of example as "LED 220") comprises a comparator 230 and a converter 240. In one embodiment, comparator 230 is implemented in form of an operation amplifier (i.e., OP AMP) and the converter 240 is implemented in form of a DC/DC converter 240. One skilled in the art would understand, however, that other functional equivalent signal processing modules may be utilized to perform the tasks of signal comparison and conversion in alternative embodiments.

Comparator 230 (hereafter referred to by way of example as "OP AMP 230") is a transistor device that amplifies and compares two or more analog signals fed to it to produce an output. Accordingly, in one embodiment, signals generated by a reference voltage source 250 and sensor 210 are fed to OP AMP 230 to produce an output signal. The output signal from OP AMP 230 is in turn fed as input to converter 240. Converter 240, as the result, generates a control signal that is connected to LED 220 to control the illumination of LED 220.

In certain embodiments, converter 240 acts as a switch to turn LED 220 on or off. In one embodiment, converter 240 may be replaced by a switch to perform the task of switching. Referring back to FIG. 2A, depending on the value of the output signal generated by OP AMP 230, converter 240 acts as a switch to turn LED 220 on or off.

As an alternative to switching the LED 220 on or off, OP AMP 230 may be implemented to control the illumination intensity of LED 220 based on the value of the output signal generated by OP AMP 230. In one embodiment, for example, converter 240 comprises a shutdown pin, which is configured to control the input voltage to LED 220, such that LED 220 can be turned on, or turned off, or dimmed based on variations in the applied voltage or current through LED 220.

It is noteworthy that in one embodiment of the invention different illumination states may be configured for LED 220. These illumination states may be configured based on the value of reference voltage 250 and the intensity of ambient light detected by sensor 210. Particularly, reference voltage 250 can be configured as a threshold against which the intensity of ambient light is measured. Thus, when signals generated by sensor 210 and reference voltage 250 are both provided as inputs to OP AMP 230, a comparison between the detected light intensity and the configured threshold can provide a measurement to determine if the ambient light is sufficient for a specific purpose.

Thus, reference voltage 250 can be set, depending on implementation, either by a user or the manufacturer to adjust the level of sensitivity for illuminating system 200. For example, setting reference voltage 250 (i.e., the threshold value) equal to X would result in converter 240 activating LED 220, if intensity of the ambient light falls below the threshold value. A reverse relationship may be also implemented, such that LED 220 is deactivated, if intensity of the ambient light exceeds the threshold value.

Implementation of a single threshold value can result in an undesirable jittering effect when the ambient light is approximately equal or near the threshold value X. That is, the LED 220 may be repeatedly activated and deactivated if the ambient light continuously falls below or exceeds the threshold value. To over come this effect, in one embodiment, two separate thresholds X1 and X2 are implemented, such that X1 is less than X2 or X1<X<X2, wherein LED 220 is activated when the ambient light falls below X1 and the LED 220 is deactivated the ambient light exceeds X2.

The above implemented threshold schemes may be applied to other embodiments of the invention discussed in the following. Furthermore, all light control mechanisms discussed herein may be implemented in conjunction and in addition to currently used light control mechanisms in a mobile device. For example, the illumination system 200 may be switch to a dormant mode, if mobile device 100 is turned off, in a sleep mode, deactivated, closed (i.e., flipped close), or inactive for a predetermined period.

Referring to FIG. 2B, an alternative exemplary embodiment of illumination system 200 comprises a sensor 210, an LED 220, a power management chip 260, and a processor 270. Power management chip 260 may be a semiconductor device, or other logic module implemented in hardware, software or a combination of the two. For example, in one embodiment, power management chip 260 may comprise a programmable logic device (PLD) (e.g., field programmable gate array (FPGA), application specific integrated circuit (ASIC), etc.).

In one embodiment, sensor 210 generates a signal that indicates the intensity of ambient light. This signal is processed by power management chip 260 to produce a control signal that is fed to processor 270. Processor 270 may be a microprocessor, or a microcontroller designed and developed by Texas Instruments or Qualcomm Corporations, or other chip manufacturer. Processor 270 operates based on instructions provided by control software 1122 and control signal produced by power management chip 260, for example, to determine the timing and intensity of LED 220's illumination.

Control software 1122 may comprise one or more software modules or may be implemented as one or more hardware modules, or a combination of hardware and software. These modules are collectively or individually executed on processor 270 and/or power management chip 260 to perform the related control and illumination functions. Thus, in one or more embodiments, a control mechanism such as control software 1122 in conjunction with power management chip 260 and processor 270 is implemented to monitor LED 220 luminance, according to control signals generated by sensor 210 and power management chip 260.

It is noteworthy that the hardware components illustrated in FIGS. 2A and 2B, such as OP AMP 230, DC/DC converter 240, power management chip 260, processor 270, and sensor 210 may be implemented in accordance with one or more embodiments, as hardware or software modules, a combination of the two, or alternative embodiments that accomplish the same functions.

For example, referring to FIG. 2B, in one embodiment, power management chip 260 can be implemented as an analog to digital (A/D) converter for converting the signal generated by sensor 210 to a second signal representing the ambient light intensity. An alternate implementation for illumination system 200 may comprise a processor 270 that includes an A/D converter as a part of its circuit design, for example, such that the signal generated by sensor 210 is directly fed to an input pin of processor 270 corresponding to an input line of the incorporated A/D converter.

Figure 3A:
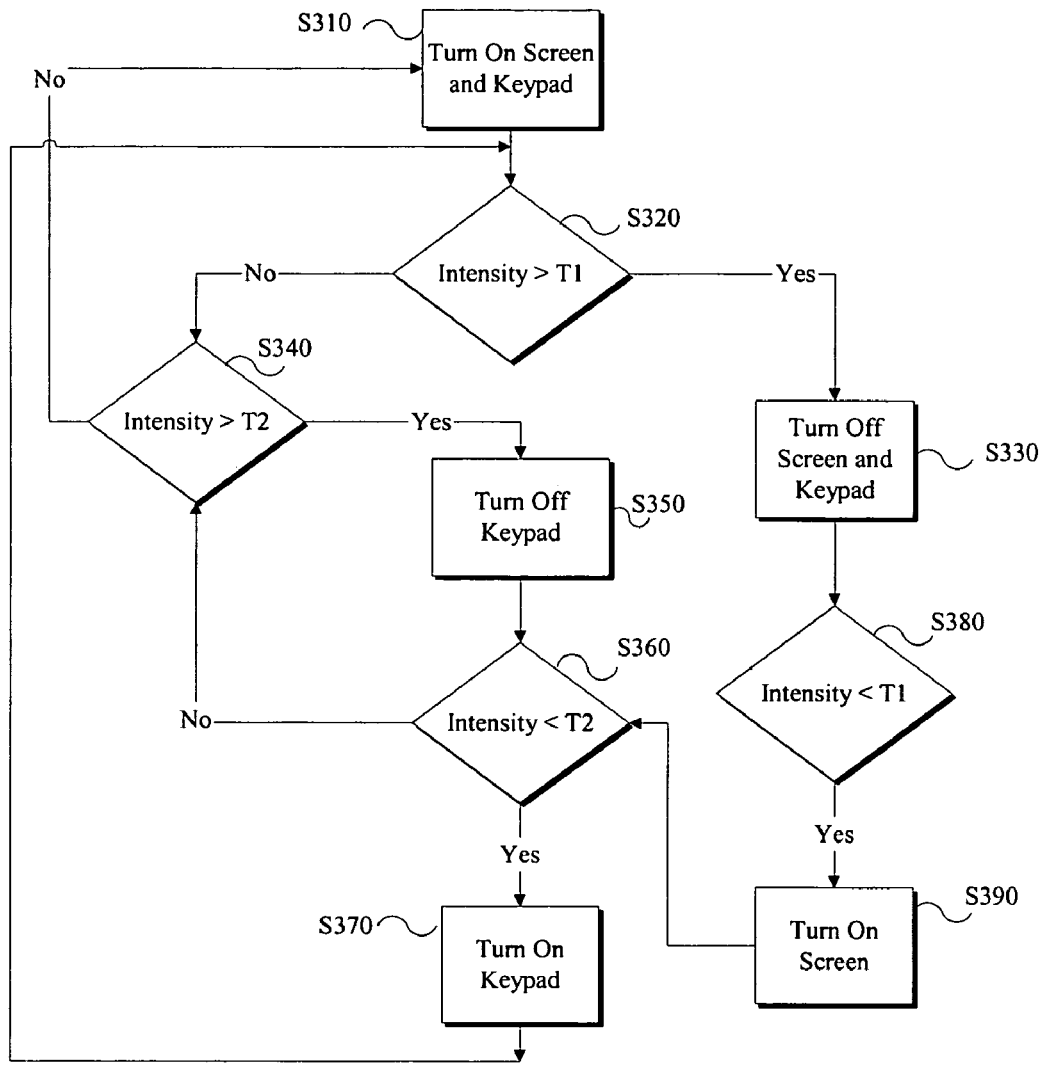
FIGS. 3A and 3B are flow diagrams of control methods for the exemplary power management systems illustrated in FIGS. 2A and 2B, in accordance with one or more embodiments.
Figure 3B:
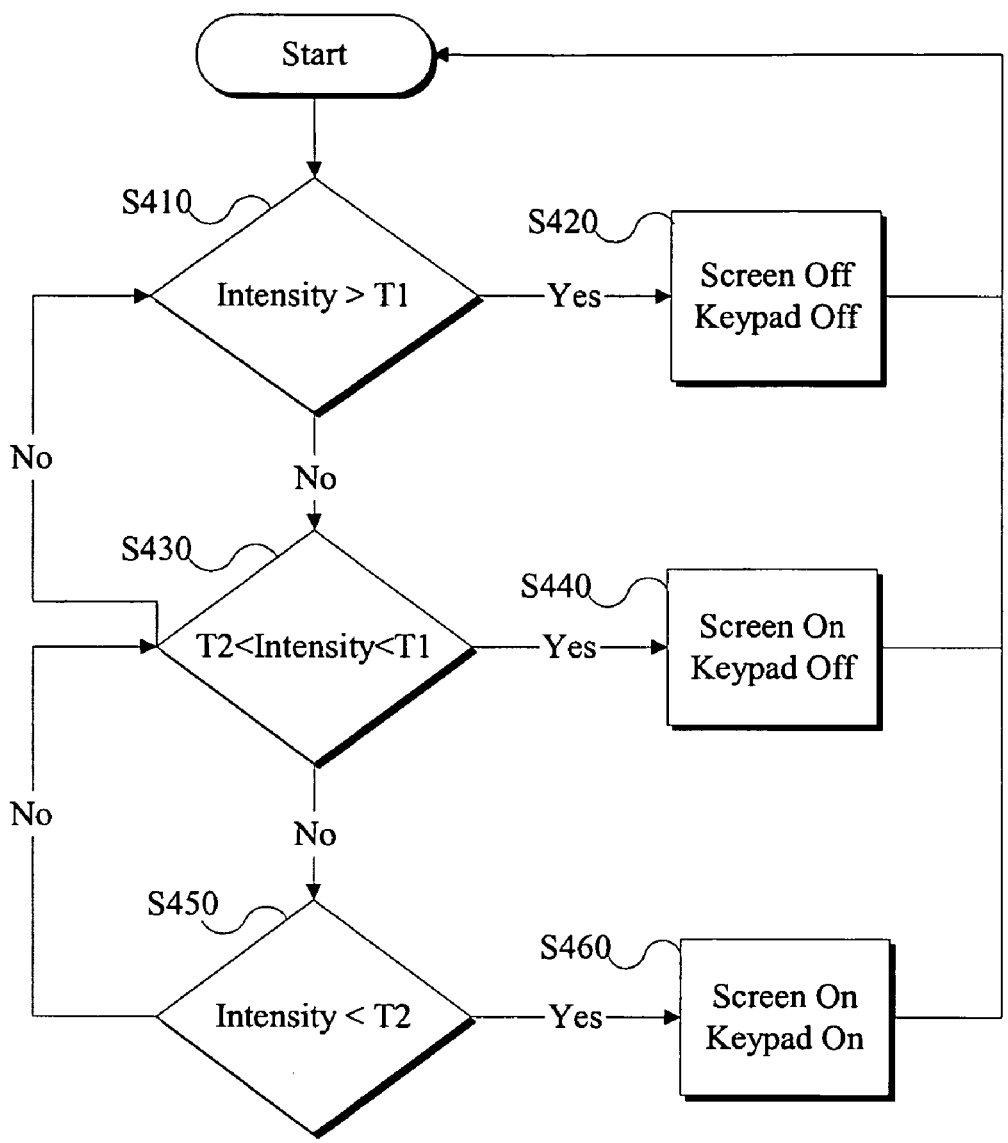

Referring to FIGS. 3A and 3B, two exemplary methods for controlling the operation of illumination system 200 are provided, in application to system implementations illustrated in FIGS. 2A and 2B. It should be noted that part or all of these exemplary methods may be implemented as logic code in hardware or software, and in some embodiments in form of control software 1122.

In the following, one or more embodiments of the invention are described, by way of example, as applicable to an illuminating system for controlling the backlight for a screen 110 or keypad 120. In other embodiments, however, different user interface devices may be illuminated according to the concepts and advantages provided herein. Therefore, the scope of the invention shall not be construed as limited to the specific user interfaces or devices particularly disclosed in the following, for the purpose of example.

Referring to FIGS. 1 and 3A, in one embodiment of the invention, when mobile device 100 is turned on, LED 220 (i.e., backlight) for one or both of screen 110 and keypad 120 is turned on (S310). Sensor 210 is configured to monitor the intensity of light to which mobile device 100 is exposed. If sensor 210 detects that the intensity of ambient light is greater than a first threshold T1 (S320), for example, then referring to FIGS. 2A and 2B a control signal is generated to turn off the backlight for screen 110 and keypad 120 (S330). As such, where mobile device 100 is in a lighting condition where screen 110 and keypad 120 can be easily viewed by a user, then the backlight is turned off.

Conversely, if mobile device 100 is in a darker setting, for example, then sensor 210 determines if intensity of ambient light is below a threshold T1 (S380). If so, then a control signal is generated, as discussed with reference to FIGS. 2A and 2B, to turn on the backlight for screen 110 and/or keypad 120.

In some embodiments, each user interface such as screen 100 or keypad 120 is equipped with a separate or dedicated backlight, such that each user interface can be separately and independently illuminated. Therefore, more battery power can be save if fewer user interface devices are illuminated, instead of all of them being illuminated at the same time. For example, in slightly dark conditions (e.g., at sun down) keypad 120 may be sufficiently visible for use purposes, but screen 110 may not. Therefore, illumination system 200 can be configured to illuminate screen 110 in such condition, and not keypad 120.

Accordingly, in one embodiment, more than a single threshold may be set, so that for example when it is really dark both screen 110 and keypad 120 are illuminated. And, when is not as dark, then only screen 110 is illuminated. That is, the backlight for different user interface devices is turned on or off, depending on the visibility attributes associated with each device.

Referring back to FIG. 3A, in one embodiment, two separate thresholds T1 and T2 are implemented, such that if the light intensity falls below the first threshold T1, then the backlight for screen 110 is turned on (S390) and when the light intensity falls below the second threshold T2, then the backlight for keypad 120 is turned on also (S370). If sensor 210 detects that the ambient light intensity is between the first and second thresholds Ti and T2, the backlight for screen 110 remains on and the backlight for keypad 120 is turned off (S350).

If after mobile device 100 is turned on, sensor 210 detects that the light intensity is below the first threshold T1 (S320) and below the second threshold T2 (S340), then backlights for both screen 110 and keypad 120 are turned on or remain on (S310). Otherwise, the backlight for keypad 120 is turned off, if the light intensity is between the first threshold T1 and second threshold T2 (S350); and the backlight for screen 110 is turned off, if the light intensity is determined to be over the first threshold T1 (S330), as provided earlier.

FIG. 3A represent an exemplary method and therefore in other embodiments different logic variations and control orders may be implemented to accomplish the same or similar results illustrated in FIG. 3A. For example, when mobile terminal 100 is turned on, mobile terminal 100 may be implemented such that the backlight for all user interfaces is off. Therefore, a different but similar logic would be followed to turn the backlight on or off when the light intensity falls below the thresholds T1 and/or T2.

In one embodiment, illumination system 200 is designed so that it controls the illumination intensity of the backlight (e.g., LED 220), instead of simply turning it on and off. As such, the backlight illumination is changed in degradations to adjust to the changes in the intensity of ambient light. That is, instead of turning off the backlight when intensity of the ambient light exceeds a threshold, illumination system 200 gradually reduces the intensity of the backlight toward zero, until the threshold is exceed. A reverse method for increasing the intensity of backlight can be implemented in other embodiments, so that the backlight's luminance is gradually increased to a maximum, as the ambient light's intensity is reduced to a minimum, for example.

Referring to FIG. 3B, yet another embodiment of the invention is provided in application to illumination system 200 depicted in FIG. 2B. Control software 1122 is executed on processor 270 (in conjunction with power management chip 260) to analyze the produced control signal by sensor 210.

In one embodiment, if sensor 210 detects that intensity of ambient light is greater than a first threshold T1 (S410), then control software 1122 causes processor 270 to generate a signal to control LED 220, such that the backlights for both screen 110 and keypad 120 of mobile device 100 are turned off, or remain turned off (S420).

If the intensity of ambient light is between the first threshold T1 and the second threshold T2 (430), then control software 1122 causes processor 270 to generate a signal to turn the backlight for screen 110 on, or keep it on; and to turn the backlight for keypad 120 off, or keep it off (440). If the intensity of ambient light is less than the second threshold T2 (450), then control software 1122 causes processor 270 to generate a signal to turn the backlights for screen 110 and keypad 120 on, or keep both on (460).

As disclosed earlier with respect to FIG. 3A, alternative embodiments of the invention may be implemented to control the illumination of the user interface components, such as screen 110 and keypad 120 based on gradual changes in the intensity of ambient light, such that instead of turning the respective backlights for each user interface on and off, each backlight is dimmed gradually or enhanced in intensity, depending on changes in ambient light and the corresponding attributes for each user interface device.

In some embodiments, the control, monitoring and switching functions discussed above in relation to control software 1122 are implemented in hardware, or a combination of hardware and software. As such, although control software 1122 is disclosed as applicable to the system of the present invention, this application is by way of example and shall not be construed to limit the scope of the invention to a software solution.

In embodiments of the system, mobile device 100 comprises a controlled system environment that can be presented largely in terms of hardware components and software code executed to perform processes that achieve the results contemplated by the system of the present invention. A more detailed description of such system environment is provided below with reference to FIGS. 4A and 4B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and control software 1122. System software 1121 comprises control programs, such as the operating system (OS) and information management systems that instruct the hardware how to function and process information. Control software 1122 is a program that performs a specific task, such as controlling illumination of a backlight for one or more user interface devices connected to mobile device 100. In certain embodiments of the invention, system and application software are implemented and executed on one or more hardware environments, for example.

Figure 4A:
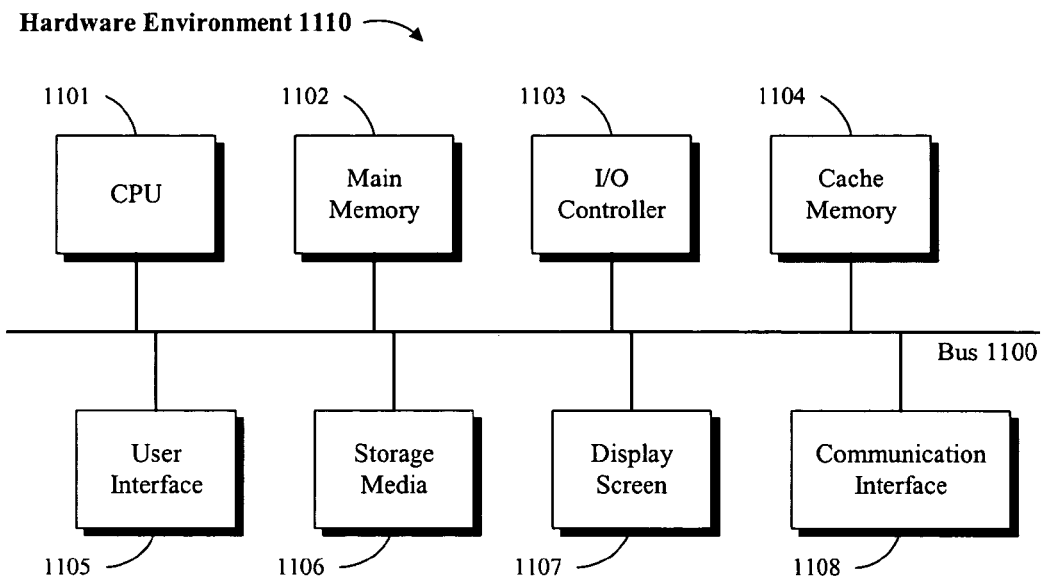
FIGS. 4A and 4B are block diagrams of hardware and software environments in which a system of the present invention may operate, in accordance with one or more embodiments.

Referring to FIG. 4A, an embodiment of the control software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Blue tooth port, a wireless modem, etc.), and a system synchronizer (e.g., a clock, not shown in FIG. 4A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless communication unit (e.g., cellular phone), or other similar hardware platforms that have information processing and/or data storage and communication capabilities. For example, in one or more embodiments of the system, hardware environment 1110 may comprise a PMG unit or an equivalent thereof.

In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Figure 4B:
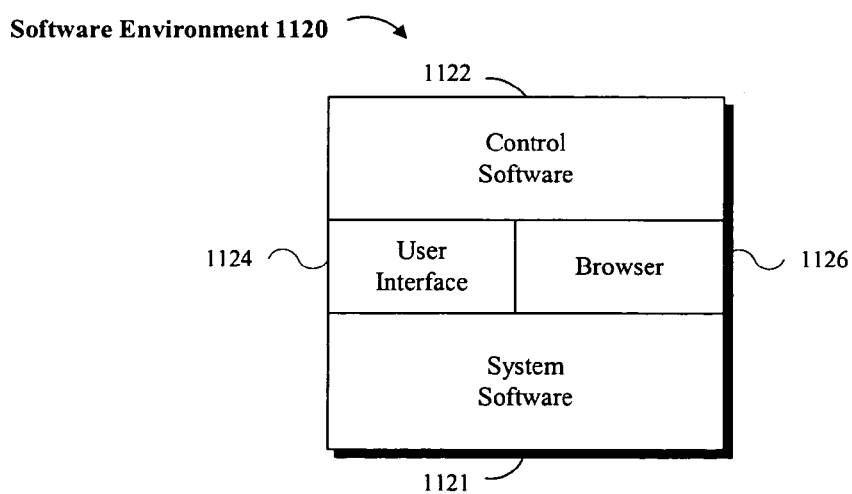

Referring to FIG. 4B, software 1120 or one or more of its components is stored in storage media 1106 and is loaded into memory 1102 prior to execution. Software environment 1120 comprises system software 1121 and control software 1122. Depending on system implementation, certain aspects of software environment 1120, and particularly control software 1122, can be loaded on one or more hardware environments 1110, or subcomponents thereof.

System software 1121 comprises software such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Microsoft Windows, Macintosh OS, or IBM OS/2. However, any other suitable operating system may be utilized.

Control software 1122 can comprise one or more computer programs that are executed on top of system software 1121 after being loaded from storage media 1106 into memory 1102. In a client-server architecture, control software 1122 may comprise client software and/or server software.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods for controlling an illumination system in a mobile device. In this exemplary embodiment, logic code for performing these methods is implemented in the form of, for example, control software 1122. The logic code, in one embodiment, may be comprised of one or more modules that execute on one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a single computer a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method for controlling an illumination system for a mobile device, the method comprising:
   measuring a first intensity of ambient light for the mobile device using a light sensing mechanism;
   receiving first and second ambient light intensity threshold values from the user of said mobile device;
   storing said first and second ambient light intensity threshold values in said mobile device;
   comparing the first intensity with said first and second ambient light intensity threshold values;
   adjusting illumination intensity of a first illuminating mechanism that illuminates a first user interface component of the mobile device, when the first intensity is not approximately equal to the first ambient light intensity threshold value;
   adjusting illumination intensity of a second illuminating mechanism that illuminates a second user interface component of the mobile device, when the first intensity is not approximately equal to the second ambient light intensity threshold value;
   establishing a stable illumination intensity state for the first and second illumination mechanism wherein a user defined predetermined range about each of the first and second thresholds is established by a first and second lower bound and a first and second upper bound,
   wherein the first illumination mechanism intensity is adjusted when the ambient light intensity is less than the first lower bound and greater than the first upper bound, and
   wherein the second illumination mechanism intensity is adjusted when the ambient light intensity is less than the second lower bound and greater than the second upper bound.

2. The method of claim 1, wherein the adjusting comprises increasing the illumination intensity of the illuminating mechanism.

3. The method of claim 1, wherein the adjusting comprises decreasing the illumination intensity of the illuminating mechanism.

4. The method of claim 2, wherein the adjusting takes place when the first intensity is less than the threshold value.

5. The method of claim 3, wherein the adjusting takes place when the first intensity is greater than the threshold value.

6. The method of claim 1, wherein the illuminating mechanism is a backlight for lighting the user interface.

7. The method of claim 6, wherein the illuminating mechanism is a light emitting diode (LED).

8. The method of claim 1, wherein the user interface comprises one or more keys on a keypad of the mobile device.

9. The method of claim 1, wherein the user interface comprises a display screen of the mobile device.

10. The method of claim 1, further comprising:
    assigning a first illumination state to the first and second user interface components, when intensity of ambient light is greater than a first ambient light intensity threshold;
    assigning the first illumination state to the first interface component, and a second illumination state to the second interface device, when the intensity of the ambient light is between the first ambient light intensity threshold and a second ambient light intensity threshold; and
    assigning the second illumination state to the first and second user interface component, when the intensity of the ambient light is less than the second ambient light intensity threshold,
    wherein the first illumination state represents an on state and the second illumination state represents an off state.

11. An illumination system for illuminating one or more user interface components of a mobile device, the illumination system comprising:
    a light sensor for measuring intensity of ambient light;
    a first illumination mechanism for illuminating a first user interface component;
    a second illumination mechanism for illuminating a second user interface component;
    input control means for entering illumination preferences into said mobile device comprising a first ambient light intensity threshold and a second ambient light intensity threshold;
    storage means for storing said preferences; and
    a power management module for adjusting illumination intensity of the first and second illumination mechanisms based on the intensity of the ambient light and said preferences and establishing a stable illumination intensity state for the first and second illumination mechanism wherein a user defined predetermined range about each of the first and second thresholds is established by a first and second lower bound and a first and second upper bound,
    wherein the first illumination mechanism intensity is adjusted when the ambient light intensity is less than the first lower bound and greater than the first upper bound,
    wherein the second illumination mechanism intensity is adjusted when the ambient light intensity is less than the second lower bound and greater than the second upper bound.

12. The system of claim 11, wherein the power management module causes the illumination intensity of the first illumination mechanism to be increased, when the intensity of the ambient light is less than the first ambient light intensity threshold.

13. The system of claim 11, wherein the power management module causes the illumination intensity of the first illumination mechanism to be decreased, when the intensity of the ambient light is more than the first ambient light intensity threshold.

14. The system of claim 11, wherein the light sensor comprises a phototransistor.

15. The system of claim 11, wherein the first illumination mechanism comprises a light emitting diode (LED).

16. The system of claim 11, wherein the power management module comprises:
   a comparator for comparing a first signal generated by the light sensor with a second signal generated by a voltage source, wherein the first signal represents the intensity of the ambient light and the second signal represents the first ambient light intensity threshold value.

17. The system of claim 16, wherein the power management module further comprises:
   a converter for adjusting illumination intensity of the first illumination mechanism based on a third signal generated by the comparator, the third signal representing a relationship between values represented by the first signal and the second signal.

18. The system of claim 11, wherein the power management module comprises:
   a power management chip in communication with a microcontroller for determining a degree with which the illumination intensity of the first illumination mechanism is adjusted.

19. The system of claim 18, wherein the power management chip comprises an analog to digital (A/D) converter for convening a first signal provided by the light sensor to a second signal provided to the microcontroller, wherein the first signal represents intensity of the ambient light, and the second signal represents a value used by the microcontroller to adjust the intensity of the first illumination mechanism.

* * * * *